United States Patent
Al-Jabri

(10) Patent No.: US 11,708,274 B2
(45) Date of Patent: Jul. 25, 2023

(54) SYNTHESIS OF POLYETHYLENIMINE-SILICA JANUS NANOPARTICLES

(71) Applicant: SAUDI ARABIAN OIL COMPANY, Dhahran (SA)

(72) Inventor: Nouf Mohammed Al-Jabri, Dammam (SA)

(73) Assignee: SAUDI ARABIAN OIL COMPANY

(*) Notice: Subject to any disclaimer, the term of this patent is extended or adjusted under 35 U.S.C. 154(b) by 452 days.

(21) Appl. No.: 16/849,587

(22) Filed: Apr. 15, 2020

(65) Prior Publication Data

US 2021/0323831 A1    Oct. 21, 2021

(51) Int. Cl.
| | |
|---|---|
| C09K 8/584 | (2006.01) |
| C01B 33/146 | (2006.01) |
| C08L 79/02 | (2006.01) |
| C09K 11/06 | (2006.01) |
| B82Y 40/00 | (2011.01) |

(52) U.S. Cl.
CPC ............ *C01B 33/146* (2013.01); *C08L 79/02* (2013.01); *C09K 8/584* (2013.01); *C09K 11/06* (2013.01); *B82Y 40/00* (2013.01); *C01P 2004/62* (2013.01); *C01P 2004/64* (2013.01); *C09K 2208/10* (2013.01)

(58) Field of Classification Search
CPC ... B82Y 40/00; C01B 33/146; C01P 2004/62; C01P 2004/64; C08L 79/02; C09K 11/06; C09K 2208/10; C09K 8/584; E21B 43/20
See application file for complete search history.

(56) References Cited

U.S. PATENT DOCUMENTS

| | | | |
|---|---|---|---|
| 7,875,654 B2 | 1/2011 | Hong et al. | |
| 8,822,386 B2 | 9/2014 | Quintero et al. | |
| 9,441,462 B2 | 9/2016 | Chakraborty et al. | |
| 2014/0234427 A1* | 8/2014 | Gibson | C09K 8/52 426/654 |

(Continued)

FOREIGN PATENT DOCUMENTS

| | | |
|---|---|---|
| CN | 101885813 A | 11/2010 |
| CN | 109370549 A | 2/2019 |

(Continued)

OTHER PUBLICATIONS

International Search Report and Written Opinion for PCT Application No. PCT/US2021/070393 dated Jul. 29, 2021.

(Continued)

*Primary Examiner* — Alicia Bland
(74) *Attorney, Agent, or Firm* — Bracewell LLP; Constance Gall Rhebergen

(57) ABSTRACT

Embodiments of the disclosure provide an asymmetrically functionalized nanoparticle and a method for synthesizing the same. The asymmetrically functionalized nanoparticle includes a base nanoparticle. The base nanoparticle can include silicon dioxide. The base nanoparticle can have a lipophilic surface. A portion of the surface can be functionalized with a functionalizing material forming a hydrophilic portion. The functionalizing material can include polyethylenimine. A remaining portion of the surface is not functionalized forming a lipophilic portion. The asymmetrically functionalized nanoparticle is amphiphilic.

22 Claims, 7 Drawing Sheets

(56) References Cited

U.S. PATENT DOCUMENTS

| | | |
|---|---|---|
| 2018/0028683 A1 | 2/2018 | Wong et al. |
| 2018/0072938 A1 | 3/2018 | Mazyar et al. |
| 2020/0109055 A1* | 4/2020 | Czaplewski-Campbell ................ A01N 31/16 |
| 2021/0395093 A1* | 12/2021 | Huang ................... C09K 8/506 |

FOREIGN PATENT DOCUMENTS

| | | |
|---|---|---|
| WO | 2008118511 A1 | 10/2008 |
| WO | 2016026464 A1 | 2/2016 |
| WO | 2016064718 A1 | 4/2016 |
| WO | 2017204372 A1 | 11/2017 |
| WO | 2018067469 A1 | 4/2018 |

OTHER PUBLICATIONS

Glaser et al., "Janus Particles at Liquid-Liquid Interfaces", Langmuir, 2006, pp. 5227-5229, American Chemical Society.

Luo et al. "Nanofluid of graphene-based amphiphilic Janus nanosheets for tertiary or enhanced oil recovery: High performance at low concentration", PNAS, 2016, vol. 113, pp. 7711-7716.

Luo et al., "Secondary Oil Recovery Using Graphene-Based Amphiphilic JanusNanosheet Fluid at an Ultralow Concentration", I&EC Research, 2017, pp. 8, ACS Publication.

* cited by examiner

SYNTHESIS OF POLYETHYLENIMINE-SILICA JANUS NANOPARTICLES

BACKGROUND

Field of the Disclosure

Embodiments of the disclosure generally relate to asymmetrically functionalized nanoparticles. More specifically, embodiments of the disclosure relate to a method and composition for asymmetrical polyethylenimine-functionalized silica nanoparticles for use in tertiary oil recovery.

Description of the Related Art

The conventional production of crude oil generally includes three stages. The primary stage utilizes the natural pressure differential between the well and the reservoir. The secondary stage typically uses water flooding to provide an artificial pressure differential between the well and the reservoir. The tertiary stage commonly involves chemical flooding to reduce the interfacial tension between the crude oil and the injected water by utilizing bulk chemicals such as polymers, surfactants, and alkali metals to obtain mobility control of the residual crude oil after primary and secondary oil recovery.

However, tertiary oil recovery is limited by certain factors such as the price of crude oil, the potential pollution of underground water, and harsh reservoir conditions. Nanofluid flooding has received a growing amount of attention, where nanofluids involve solutions including dispersed nanoparticles. The nanoparticle concentration of the nanofluids is typically less than 0.01 wt. %, which offers economic and environmental efficiency in comparison with chemical flooding. However, the nanoparticles used in such nanofluids typically have an isotropic surface morphology that limits the stability of the emulsion or foam created by such nanoparticles.

SUMMARY

Embodiments of the disclosure generally relate to asymmetrically functionalized nanoparticles. More specifically, embodiments of the disclosure relate to a method and composition for asymmetrical polyethylenimine-functionalized silica nanoparticles for use in tertiary oil recovery.

Advantageously, the anisotropic nature of the asymmetrically functionalized nanoparticles allows two different chemistries to take place at the same time. The unique surface property allows the asymmetrically functionalized nanoparticles to selectively adsorb at an oil-water interface at least three times greater than isotropic nanoparticles, enhancing the stability of an emulsion. The enhanced emulsion stability leads to an increased degree of oil displacement in comparison with conventional oil recovery operations.

Embodiments of the disclosure provide a method for synthesizing an asymmetrically functionalized nanoparticle. The method includes the step of surface-treating a base nanoparticle with an alcohol such that the base nanoparticle has hydroxyl groups distributed throughout an exterior of the base nanoparticle. The method includes the step of dispersing the base nanoparticle in an aqueous solvent to form an aqueous dispersion. The method includes the step of introducing a waxy material to the aqueous dispersion to form an emulsion. The emulsion is maintained at a temperature greater than a melting point of the waxy material. The emulsion includes liquid colloidosomes including the waxy material as an interior component and the base nanoparticle as an exterior component. The method includes the step of cooling the emulsion to a temperature less than the melting point of the waxy material such that solidified colloidosomes are formed. The method includes the step of chemically modifying an exposed surface of the base nanoparticle using a functionalizing material. The method includes the step of removing the waxy material to release the asymmetrically functionalized nanoparticle.

In some embodiments, the asymmetrically functionalized nanoparticle is amphiphilic. In some embodiments, the base nanoparticle has a lipophilic surface. In some embodiments, the functionalizing material is hydrophilic.

In some embodiments, the base nanoparticle includes silicon dioxide. In some embodiments, the base nanoparticle has a size ranging between 80 nm and 200 nm.

In some embodiments, the functionalizing material includes polyethylenimine. In some embodiments, a fluorophore is labeled to the polyethylenimine. In some embodiments, the fluorophore is fluoresceinisothiocyanate (FITC).

In some embodiments, the alcohol includes methanol, ethanol, propanol, combinations of the same, and aqueous solutions of the same. In some embodiments, the waxy material includes paraffin wax.

In some embodiments, the surface-treating step is conducted at a temperature ranging between 60 deg. C. and 70 deg. C. for a duration ranging between one hour and two hours. In some embodiments, the introducing step is conducted at a temperature ranging between 60 deg. C. and 100 deg. C.

In some embodiments, the removing step includes dissolving the waxy material with an organic solvent. In some embodiments, the organic solvent includes chloroform, toluene, diethyl ether, and combinations of the same.

Embodiments of the disclosure also provide an asymmetrically functionalized nanoparticle. The asymmetrically functionalized nanoparticle includes a base nanoparticle. The base nanoparticle includes silicon dioxide. The base nanoparticle has a lipophilic surface. A portion of the surface is functionalized with polyethylenimine forming a hydrophilic portion. A remaining portion of the surface is not functionalized forming a lipophilic portion. The asymmetrically functionalized nanoparticle is amphiphilic.

In some embodiments, the polyethylenimine is labeled with a fluorophore. In some embodiments, the fluorophore is FITC.

In some embodiments, the base nanoparticle has a size ranging between 80 nm and 200 nm. In some embodiments, the asymmetrically functionalized nanoparticle is configured to form a continuous phase in a Winsor III type system including an oil phase and a water phase.

Embodiments of the disclosure also provide a method for hydrocarbon recovery using an asymmetrically functionalized nanoparticle. The method includes the step of introducing the asymmetrically functionalized nanoparticle to a subterranean formation. The subterranean formation includes crude oil and water forming an interface. The asymmetrically functionalized nanoparticle reduces interfacial tension between the crude oil and the water at the interface.

In some embodiments, the asymmetrically functionalized nanoparticle is formed by the step of surface-treating a base nanoparticle with an alcohol such that the base nanoparticle has hydroxyl groups distributed throughout an exterior of the base nanoparticle. The asymmetrically functionalized nanoparticle is formed by the step of dispersing the base nanoparticle in an aqueous solvent to form an aqueous dispersion. The asymmetrically functionalized nanoparticle is formed by the step of introducing a waxy material to the aqueous dispersion to form an emulsion. The emulsion is maintained at a temperature greater than a melting point of the waxy material. The emulsion includes liquid colloidosomes including the waxy material as an interior component and the base nanoparticle as an exterior component. The asymmetrically functionalized nanoparticle is formed by the step of cooling the emulsion to a temperature less than the melting point of the waxy material such that solidified colloidosomes are formed. The asymmetrically functionalized nanoparticle is formed by the step of chemically modifying an exposed surface of the base nanoparticle using a functionalizing material. The asymmetrically functionalized nanoparticle is formed by the step of removing the waxy material to release the asymmetrically functionalized nanoparticle.

In some embodiments, the asymmetrically functionalized nanoparticle is amphiphilic. In some embodiments, the base nanoparticle has a lipophilic surface. In some embodiments, the functionalizing material is hydrophilic.

In some embodiments, the base nanoparticle includes silicon dioxide. In some embodiments, the base nanoparticle has a size ranging between 80 nm and 200 nm.

In some embodiments, the functionalizing material includes polyethylenimine. In some embodiments, a fluorophore is labeled to the polyethylenimine. In some embodiments, the fluorophore is FITC.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

Figures 1A, 1B, 1C:
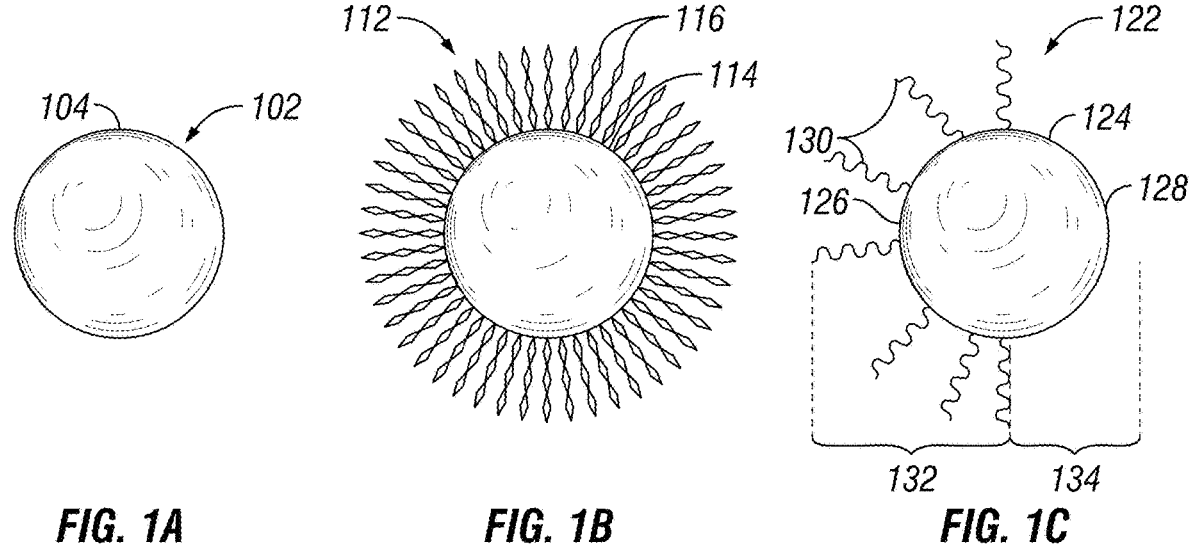
FIG. 1A is a schematic representation of a non-functionalized nanoparticle.
FIG. 1B is a schematic representation of a fully functionalized nanoparticle.
FIG. 1C is a schematic representation of an asymmetrically functionalized nanoparticle, according to an embodiment of the disclosure.

In the accompanying Figures, similar components or features, or both, may have a similar reference label.

DETAILED DESCRIPTION

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantially" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words such are for descriptive convenience and are not limiting unless otherwise indicated.

As used throughout the disclosure, the terms "Janus nanoparticle" and "asymmetrically functionalized nanoparticle" can be used interchangeably.

As used throughout the disclosure, the terms "hydrophobic" and "lipophilic" can be used interchangeably.

As used throughout the disclosure, the "amphiphile" refers to a chemical composition possessing both hydrophilic and lipophilic properties. Non-limiting examples of an amphiphile include surfactants and Janus nanoparticles.

As used throughout the disclosure, the term "microemulsion" refers to a system of oil, water, and an amphiphile which is a single, optically isotropic, and thermodynamically stable liquid solution.

As used throughout the disclosure, the term "Pickering emulsion" refers to an emulsion that is stabilized by solid particles (for example, colloidal silica) which adsorb onto the interface between two phases. For example, oil and water can be mixed to form microsized oil droplets dispersed throughout the water. Eventually, the droplets will coalesce in the absence of solid particles. However, the presence of solid particles prevents the droplets from coalescing where the solid particles bind to the surface of the interface, stabilizing the emulsion.

As used throughout the disclosure, the terms "wax" or "waxy material" refer to a water-insoluble organic material that is solid or semi-solid at room temperature, has a density less than water, and can transition to a molten state at a temperature greater than room temperature to form a liquid.

As used throughout the disclosure, the term "liquid colloidosome" refers to a colloid-sized droplet of a first liquid in a second liquid having particles at the interface formed between the first liquid and the second liquid. The term "solidified colloidosome," in which the first liquid is solidified, refers to a colloid-sized solid droplet having particles attached on or embedded to its surface.

Winsor type phase behavior terminology is used to distinguish among three phase behaviors of an oil-water-amphiphile system forming a microemulsion. In a Winsor I type system, the amphiphile is soluble in water and forms an oil-in-water (o/w) microemulsion. The amphiphile-rich water phase coexists with the oil phase separated by an oil-water interface. In a Winsor II type system, the amphiphile is soluble in oil and forms a water-in-oil (w/o) microemulsion. The amphiphile-rich oil phase coexists with the water phase separated by an oil-water interface. In a Winsor III type system, the amphiphile is soluble in both oil and water and forms a microemulsion as a separate, continuous phase. The amphiphile-rich continuous phase forms a layer that separates the oil phase and the water phase. The amphiphile-rich continuous phase includes the amphiphile, oil, and water. The Winsor III type system is favored for tertiary oil recovery, as the system exhibits reduced interfacial tension between hydrocarbon and water in reservoir conditions after secondary oil recovery.

FIG. 1A shows a schematic diagram of a non-functionalized nanoparticle 102. The spherical shape of the non-functionalized nanoparticle 102 in FIG. 1A is for illustrative purposes only; one skilled in the art would recognize that the non-functionalized nanoparticle 102 can have a three-dimensional shape other than a sphere. The non-functionalized nanoparticle 102 has a surface 104. Depending on the material used for the non-functionalized nanoparticle 102, the surface 104 can be either hydrophilic or lipophilic, but not amphiphilic. For example, silicon oxide can be used for the non-functionalized nanoparticle 102 and resultantly, the surface 104 can be lipophilic.

FIG. 1B shows a schematic diagram of a fully functionalized nanoparticle 112. The spherical shape of the fully functionalized nanoparticle 112 in FIG. 1B is for illustrative purposes only; one skilled in the art would recognize that the fully functionalized nanoparticle 112 can have a three-dimensional shape other than a sphere. The fully functionalized nanoparticle 112 has a surface 114. The surface 114, serving as a substrate, is chemically modified (that is, functionalized) with functional groups 116 throughout the entirety of the surface 114. Depending on the base material used for the fully functionalized nanoparticle 112, the surface 114 can be either hydrophilic or lipophilic, but not amphiphilic. A hydrophilic surface 114 can be chemically modified using lipophilic functional groups 116 such that the fully functionalized nanoparticle 112 can exhibit lipophilic behavior. Conversely, a lipophilic surface 114 can be chemically modified using hydrophilic functional groups 116 such that the fully functionalized nanoparticle 112 can exhibit hydrophilic behavior.

FIG. 1C shows a schematic diagram of an asymmetrically functionalized nanoparticle 122. The spherical shape of the asymmetrically functionalized nanoparticle 122 in FIG. 1C is for illustrative purposes only; one skilled in the art would recognize that the asymmetrically functionalized nanoparticle 122 can have a three-dimensional shape other than a sphere. The asymmetrically functionalized nanoparticle 122 has a surface 124. A portion of the surface 124 is a functionalized surface 126 and the remaining portion of the surface 124 is a non-functionalized surface 128. The functionalized surface 126, serving as a substrate, is chemically modified with functional groups 130 throughout the entirety of the functionalized surface 126 forming a functionalized portion 132 of the asymmetrically functionalized nanoparticle 122. The non-functionalized surface 128 is in the absence of the functional groups 130 throughout the entirety of the non-functionalized surface 128 forming a non-functionalized portion 134 of the asymmetrically functionalized nanoparticle 122. Depending on the base material used for the asymmetrically functionalized nanoparticle 122, the surface 124 can be either hydrophilic or lipophilic, but not amphiphilic. However, a portion of a hydrophilic surface 124 (that is, the functionalized surface 126) can be chemically modified using lipophilic functional groups 130 such that the functionalized portion 132 of the asymmetrically functionalized nanoparticle 122 can exhibit lipophilic behavior while the non-functionalized portion 134 of the asymmetrically functionalized nanoparticle 122 can exhibit hydrophilic behavior, resulting in the asymmetrically functionalized nanoparticle 122 exhibiting amphiphilic behavior. Conversely, a portion of a lipophilic surface 124 (that is, the functionalized surface 126) can be chemically modified using hydrophilic functional groups 130 such that the functionalized portion 132 of the asymmetrically functionalized nanoparticle 122 can exhibit hydrophilic behavior while the non-functionalized portion 134 of the asymmetrically functionalized nanoparticle 122 can exhibit lipophilic behavior, resulting in the asymmetrically functionalized nanoparticle 122 exhibiting amphiphilic behavior.

The base particle used for the asymmetrically functionalized nanoparticle 122 can include particles in the microscale and nanoscale. For example, the size of the base particle can range between about 1 nanometer (nm) and about 100 microns, alternately between about 10 nm and about 10 microns, alternately between about 50 nm and about 1 micron, or alternately between about 80 nm and about 200 nm. In at least one embodiment, the base particle can have size ranging between about 80 nm and about 110 nm. The base particle can have a variety of three-dimensional shapes, including but not limited to, spherical, ellipsoidal, rod-like, helical, and oblate. The base particle can be solid or hollow. The material used for the base particle includes silicon dioxide (or silica). Silicon dioxide can be provided in any form including but not limited to, pristine silica, quartz, tridymite, cristobalite, keatite, moganite, coesite, stishovite, seifertite, melanophlogite, sand, glass, fumed silica, and precipitated silica. One skilled in the art would recognize that the hydrophobicity of silicon dioxide depends on its crystalline form. In at least one embodiment, the base particle has a lipophilic surface.

The functionalized surface 126 can be chemically modified with a functional group 130 including polyethylenimine forming the functionalized portion 132 of the asymmetrically functionalized nanoparticle 122. The non-functionalized surface 128 is in the absence of polyethylenimine forming the non-functionalized portion 134 of the asymmetrically functionalized nanoparticle 122. Polyethylenimine can be linear or branched. Optionally, the functional group 130 can be labeled with a fluorescent dye. The fluorescent dye can include FITC. In at least one embodiment, the functionalized portion 132 of the asymmetrically functionalized nanoparticle 122 is hydrophilic. In at least one embodiment, the non-functionalized portion 134 of the asymmetrically functionalized nanoparticle 122 is lipophilic.

Figure 2:
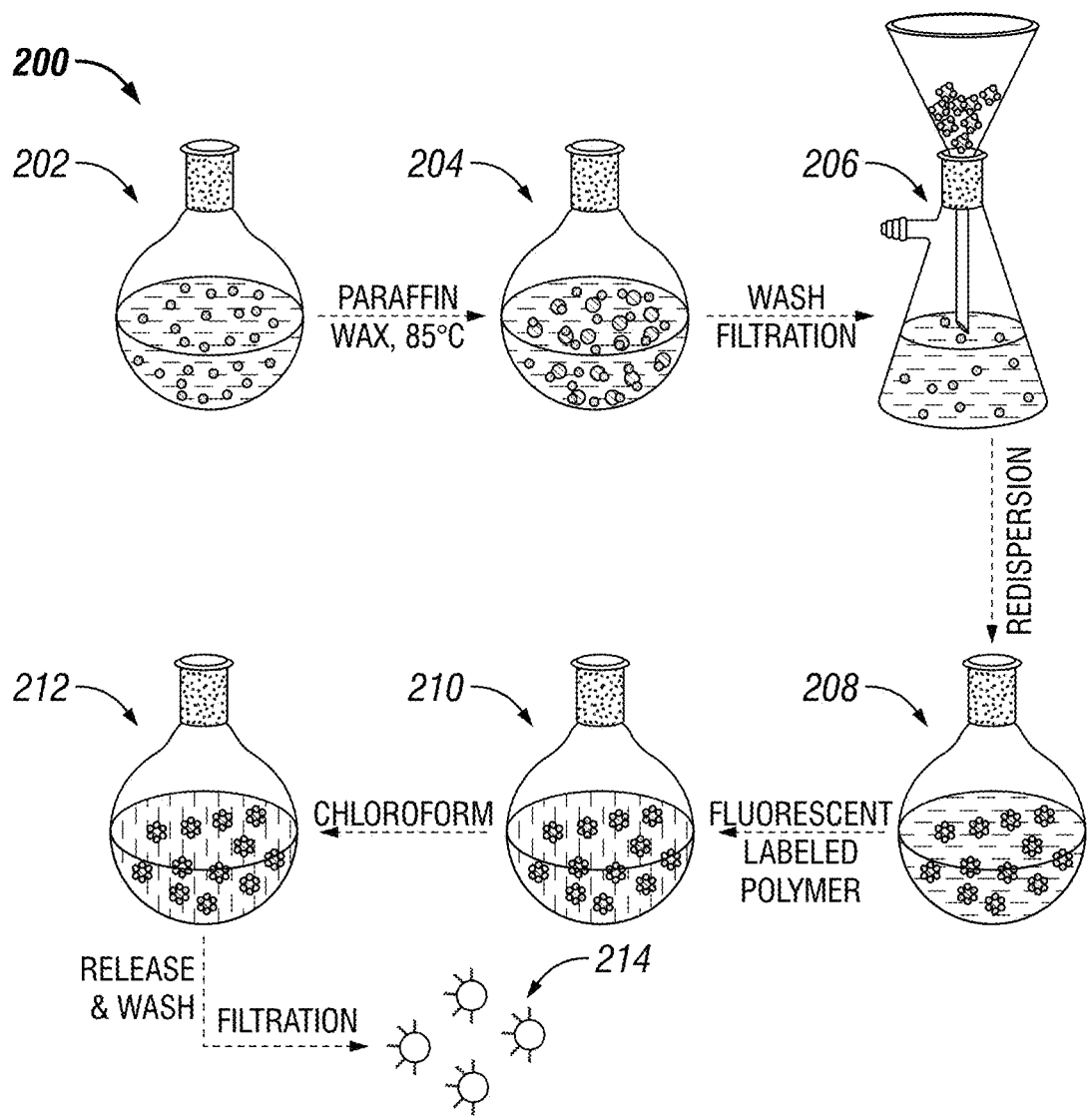
FIG. 2 is a schematic representation of a process for synthesizing an asymmetrically functionalized nanoparticle, according to an embodiment of the disclosure.

FIG. 2 shows a schematic diagram of a process 200 for synthesizing the asymmetrically functionalized nanoparticle.

In step 202, the base nanoparticle undergoes surface treatment. Treating the surface of the base nanoparticle enables one to chemically modify the surface in a controlled manner. The surface treatment can be conducted by immersing the base nanoparticle in an alcohol-based solvent (optionally combined with water). The alcohol-based solvent can include methanol, ethanol, propanol, and combinations of the same. The temperature of the alcohol-based solvent can be maintained at a temperature ranging between about 50 deg. C. and about 80 deg. C. or alternately between about 60 deg. C. and about 70 deg. C. for about one to two hours. In at least one embodiment, the temperature of the alcohol-based solvent is maintained at about 65 deg. C. for about one to two hours. In other embodiments, the surface treatment can be conducted by immersing the base nanoparticle in an aqueous sodium hydroxide solution. The sodium hydroxide solution can have a concentration ranging between about 20 wt. % and about 70 wt. %. In at least one embodiment, the sodium hydroxide solution has a concentration of about 60 wt. %. The temperature of the sodium hydroxide solution can be maintained at a temperature ranging between about 50 deg. C. and about 80 deg. C. or alternately between about 60 deg. C. and about 70 deg. C. for about one to two hours. In at least one embodiment, the temperature of the sodium hydroxide solution is maintained at about 65 deg. C. for about one to two hours. The surface treating step ensures that the surface of the base nanoparticle has hydroxyl groups evenly distributed throughout the entirety of the surface in preparation for functionalization. The surface treated base nanoparticles can be further filtrated, washed, and dried for purification. The surface treated base nanoparticles are dispersed in an aqueous solvent (such as water) forming an aqueous dispersion. The aqueous dispersion is maintained at a temperature ranging between about 50 deg. C. and about 80 deg. C. or alternately between about 60 deg. C. and about 70 deg. C. In at least one embodiment, the temperature of the aqueous dispersion is maintained at about 65 deg. C.

In step 204, the aqueous dispersion including the surface treated base nanoparticles are combined with a waxy material to form an emulsion at a temperature greater than the melting point of the waxy material. The emulsion is maintained at a temperature ranging between about 50 deg. C. and about 120 deg. C. or alternately between about 60 deg. C. and about 100 deg. C. In at least one embodiment, the temperature of the aqueous dispersion is maintained at about 85 deg. C. The waxy material can have a concentration ranging between about 4.1 wt. % and about 16.6 wt. % of the total weight of the emulsion. Optionally, a surfactant can be added to supplement the stability of the emulsion. The waxy material forms colloidal droplets in the aqueous environment, essentially forming an o/w microemulsion. A liquid-liquid interface is formed between the colloidal droplet and the aqueous environment, and the surface treated base nanoparticles are adsorbed at the liquid-liquid interface forming a liquid colloidosome. The liquid colloidosome includes the waxy material as the interior component and the surface treated base nanoparticles as the exterior component.

The waxy material can include various fatty alcohols and fatty acids, and esters of such fatty alcohols and fatty acids, having greater than ten carbon atoms. The fatty alcohols and fatty acids can be saturated or unsaturated. The fatty alcohols and fatty acids can be linear or branched. Non-limiting examples of saturated fatty acids include capric, lauric, myristic, palmitic, margaric, stearic, arachidic, behenic, tetracosanic, lignoceric, cerotic, and melissic. Non-limiting examples of unsaturated fatty acids include tiglic, hypogaeic, gaidic, physetoleic, elaidic, oleic, isooleic, erudic, brassidic, and isoerudic. Non-limiting examples of fatty alcohols include octadecyl, carnaubyl, ceryl, melissyl, and phytol. Non-limiting examples also include sterols such as cholesterol, and glycerols.

The waxy material can include natural and modified natural waxes. Non-limiting examples of natural or modified natural waxes include various plant derived waxes, grease, and oils including carnauba wax, cranberry wax, ouricuri wax, candelilla wax, raphia wax, apple, cotton and cactus waxes. Non-limiting examples of natural or modified natural waxes include waxes and greases produced by bacteria (for example, cetyl stearate), waxes and greases produced by fungi, protozoa and algae, invertebrate waxes and greases including insect waxes such as beeswaxes (for example, triacontyl palmitate, palmatyl palmitate), and *Coccus* sp. derived waxes (for example, lac, cochineal and Chinese insect), and animal fats (for example, triglycerides) and animal waxes including spermaceti (for example, cetyl palmitate), lanolin and wool grease.

The waxy material can include natural and synthetic hydrocarbons. Non-limiting examples of natural and synthetic hydrocarbons include white waxes, paraffin waxes, ceresins, silicon greases and waxes, polychlorinated and polyfluorinated hydrocarbons, aromatic hydrocarbons (such as naphthalene and durene(1,2,4,5-tetramethylbenzene)), polyether waxes, and polyester waxes. Waxes can include waxy polymers, which are polymers that have wax-like chemical or physical properties alone or when combined with other waxes. Non-limiting examples of waxy polymers include polyethylenes and polypropylenes.

In step 206, the liquid colloidosome-containing emulsion is cooled to a temperature less than the melting point of the waxy material. In at least one embodiment, the liquid colloidosome-containing emulsion is cooled to room temperature. The waxy material forming the interior of the liquid colloidosome solidifies to form a solidified colloidosome. As the waxy material solidifies, the surface treated base nanoparticles are either attached on or partially (but not fully) embedded in the exterior surface of the solid waxy material. In this manner, the surface treated base nanoparticles of the solidified colloidosome have two different surfaces, where one surface is exposed to the exterior environment (the portion of the surface to be functionalized) and the other surface is not exposed to the exterior environment (the remaining portion of the surface to be left intact). The solidified colloidosome can be further filtrated, washed, and dried for purification.

In step 208, the solidified colloidosome is re-dispersed in a solvent forming a dispersion. Non-limiting examples of the solvent include water, methanol, and ethanol. In some embodiments, the solvent includes aqueous ethanol having an ethanol concentration ranging between about 65 wt. % and about 90 wt. %.

In step 210, a functionalizing material is introduced to the solidified colloidosome dispersion to chemically modify the exposed surface of the base nanoparticle. In at least one embodiment, the functionalizing material is polyethylenimine. The functionalizing material can include a fluorophore labeled to the functionalizing material. In at least one embodiment, the fluorophore is FITC. The non-exposed surface of the base nanoparticle maintains contact with the solid waxy material and is not affected by the functionalizing material. The chemically modified, solidified colloidosomes can be further filtrated and washed for purification.

In step 212, the solid interior of the chemically modified, solidified colloidosome is removed by introducing an organic solvent capable of dissolving the waxy material. Non-limiting examples of the organic solvent include chloroform, toluene, and diethyl ether. In at least one embodiment, the organic solvent is chloroform. In this manner, the asymmetrically functionalized nanoparticle is released. In some embodiments, the solidified colloidosome can be heated to a temperature greater than the melting point of the waxy material to melt and remove the waxy material to release the asymmetrically functionalized nanoparticle. In some embodiments, the solidified colloidosome can be heated to a temperature ranging between about 40 deg. C. and about 50 deg. C. in the presence of the organic solvent to dissolve the waxy material to release the asymmetrically functionalized nanoparticle.

In step 214, the released asymmetrically functionalized nanoparticles can be further filtrated and washed for purification. The asymmetrically functionalized nanoparticles can be stored as dried particles or re-dispsersed in deionized water.

In an example embodiment of the method, the asymmetrically functionalized nanoparticles can be introduced to a subterranean formation for tertiary oil recovery. The subterranean formation is one that typically underwent primary and secondary oil recovery where residual crude oil and water (used for secondary oil recovery) coexist in the subterranean formation. The asymmetrically functionalized nanoparticles are stable under reservoir conditions and are capable of reducing the interfacial tension between the residual crude oil and water for tertiary oil recovery.

EXAMPLES

The disclosure is illustrated by the following examples, which are presented for illustrative purposes only, and are not intended as limiting the scope of the invention which is defined by the appended claims.

Example 1

Silica nanoparticles were prepared in the lab using the following procedure. 200 milliliters (mL) of a 99 wt. % ethanol (MilliporeSigma, Burlington, Mass.), 16.0 mL of 29 wt. % ammonium hydroxide (MilliporeSigma, Burlington, Mass.), and 12.2 mL of deionized water were combined and magnetically stirred at a speed of 2,100 revolutions per minute (rpm) for about 30 minutes at room temperature to form a mixture. Subsequently, 12.4 mL of tetraethyl orthosilicate (MilliporeSigma, Burlington, Mass.) was gradually added to the mixture in droplets under continuous magnetic stirring. The resulting mixture was kept overnight at room temperature. The opacity of the mixture changed from transparent to opaque over time indicative of forming the silica nanoparticles. The silica nanoparticles were filtrated and rinsed with deionized water to remove any residual material. Three cycles of centrifugation were conducted. The silica nanoparticles had a diameter ranging between about 80 nanometers (nm) and about 110 nm.

One gram of the silica nanoparticles was dispersed in 10 mL of a 90 wt. % methanol (or ethanol) solution and sonicated for about 3 to about 5 minutes at room temperature. The temperature was increased to about 65 deg. C. and the dispersion was magnetically stirred at a speed of 2,100 rpm for about one to two hours to ensure that the surfaces of the silica nanoparticles were evenly pretreated with hydroxyl groups. The surface treated silica nanoparticles were filtrated and washed with deionized water three times. The surface treated silica nanoparticles were washed with ethanol twice. The surface treated silica nanoparticles were incubated in a vacuum oven at about 110 deg. C. under vacuum for about 24 hours. The dried silica nanoparticles were dispersed in deionized water and the aqueous dispersion was sonicated for about 5-10 minutes. The aqueous dispersion was heated to a temperature of about 65 deg. C.

Pickering emulsion technique was implemented to control surface functionalization of the silica nanoparticles. Various quantities (1.0, 1.5, and 2.0 grams) of paraffin wax (locally acquired) were used as a masking agent and was gradually added to the aqueous dispersion under continuous magnetic stirring. The paraffin wax had a melting temperature of about 65 deg. C. The resulting mixture was homogenized using a homogenizer followed by increasing and maintaining the temperature at about 85 deg. C. for about two hours to ensure that liquid colloidosomes are formed. The paraffin wax formed colloidal droplets in the existing aqueous environment where the silica nanoparticles were placed at the exterior of the colloidal droplets forming the liquid colloidosomes. The mixture was cooled to room temperature such that the liquid colloidosomes formed solidified colloidosomes as the paraffin wax solidified. The solidified colloidosomes were vacuum filtrated to eliminate unattached, free flowing silica nanoparticles. The filtrated, solidified colloidosomes were re-dispersed in deionized water at room temperature to form an aqueous dispersion.

Polyethylenimine (having an average molecular weight of about 25,000, pre-dissolved in water, MilliporeSigma, Burlington, Mass.) was added to the aqueous dispersion of solidified colloidosomes to asymmetrically functionalize the silica nanoparticles. The surfaces of the silica nanoparticles exposed to the aqueous environment were chemically modified with polyethylenimine. Various quantities of polyethylenimine (5.0, 7.5, and 10 wt. %) were used to determine the impact on the synthesized Janus nanoparticle morphology. The polyethylenimine was labeled with FITC by adding about 2.0-8.0 mL of 0.001 wt. % aqueous FITC (fluorescence at 490 nm, MilliporeSigma, Burlington, Mass.) to the reaction mixture along with a few drops of ethanol. FITC was selected as the fluorophore due to its chemical affinity to react with and bond to amine groups present in polyethylenimine. Functionalization was continued overnight at room temperature. The chemically modified, solidified colloidosomes were filtrated to eliminate excess polyethylenimine and the filtrates were washed several times with ethanol.

Chloroform was added to the chemically modified, solidified colloidosomes to dissolve the paraffin wax and to release the polyethylenimine-silica Janus nanoparticles. Three cycles of centrifugation were conducted. The polyethylenimine-silica Janus nanoparticles were collected and placed in a vacuum oven at about 70-90 deg. C. under vacuum for about 48 hours.

Various quantities of paraffin wax (1.0, 1.5, and 2.0 grams) were used to determine the optimal yield of the polyethylenimine-silica Janus nanoparticles. 1.0 gram of paraffin wax produced 95.4 milligrams (mg) of Janus nanoparticles while producing 45.0 mg of non-desired, fully polyethylenimine-functionalized silica nanoparticles. 1.5 grams of paraffin wax produced 120.7 mg of Janus nanoparticles while producing 18.2 mg of non-desired, fully polyethylenimine-functionalized silica nanoparticles. 2.0 grams of paraffin wax produced 160.2 mg of Janus nanoparticles in the absence of fully polyethylenimine-functionalized silica nanoparticles.

Example 2

Figures 3A, 3B:
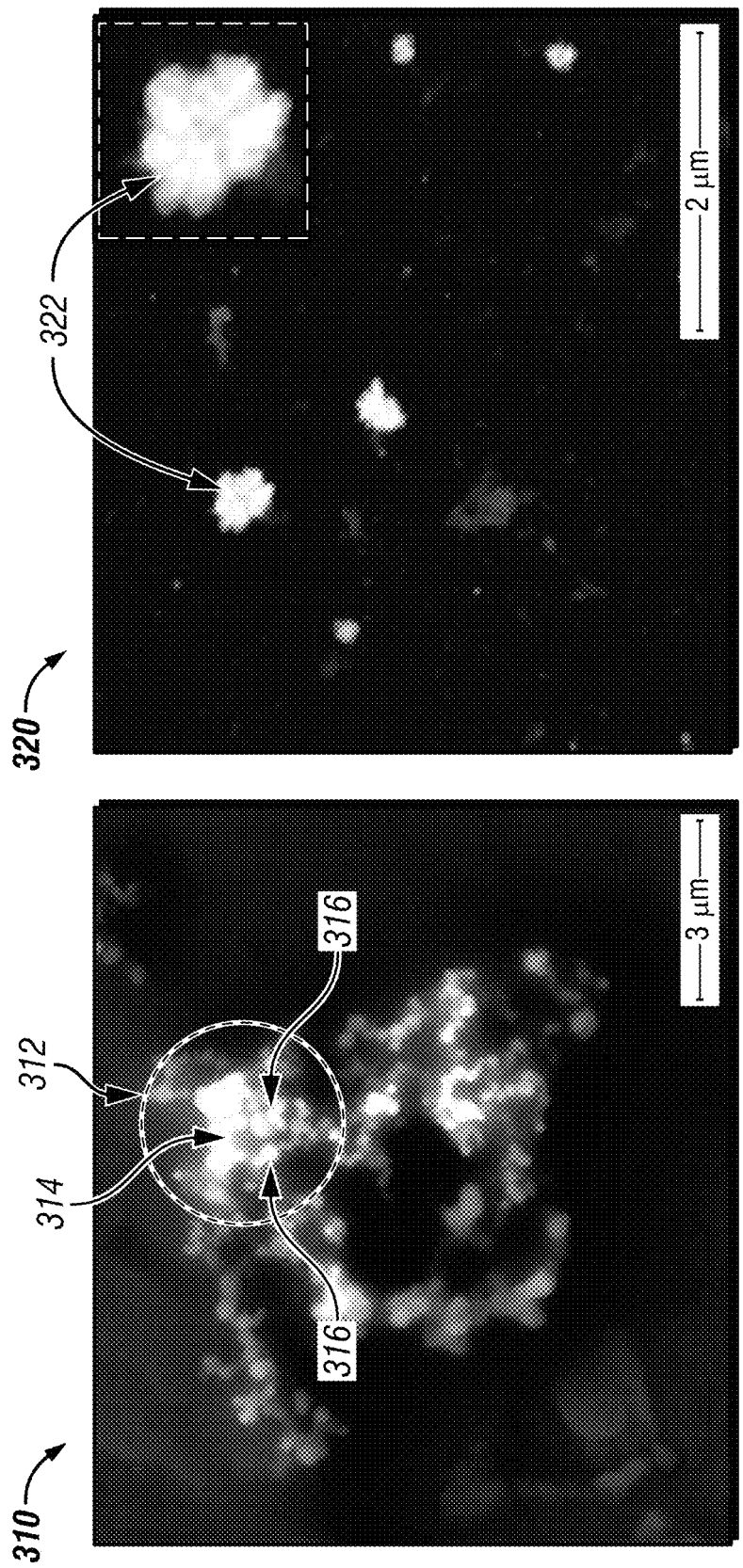
FIG. 3A is a photographical representation of solidified colloidosomes, according to an embodiment of the disclosure.
FIG. 3B is a photographical representation of asymmetrically functionalized nanoparticles, according to an embodiment of the disclosure.

Scanning electron microscopy (SEM) was used to investigate the morphology of the solidified colloidosomes (before functionalization) and the polyethylenimine-silica Janus nanoparticles. The results are shown in FIGS. 3A-B. FIG. 3A shows an SEM image 310 of the solidified colloidosomes 312 before functionalization with polyethylenimine. As can be seen, the solidified paraffin wax droplet 314 has a diameter ranging between about 1 micron and about 3 microns where the silica nanoparticles 316 (having a diameter ranging between about 0.2 microns and about 0.8 microns) are either attached on or partially (but not fully) embedded in the exterior surface of the solid wax droplet 314. FIG. 3B shows an SEM image 320 of the polyethylenimine-silica Janus nanoparticles 322 after release. The inset of FIG. 3B shows a magnified SEM image of one polyethylenimine-silica Janus nanoparticle 322. As can be seen, the paraffin wax droplets are removed via dissolution by chloroform and the polyethylenimine-silica Janus nanoparticles 322 exhibit a fibrous surface morphology due to polyethylenimine functionalized on the surface of the silica nanoparticles. The polyethylenimine-silica Janus nanoparticle 322 has a diameter ranging between about 0.2 microns and about 0.8 microns.

Example 3

Figure 4A:
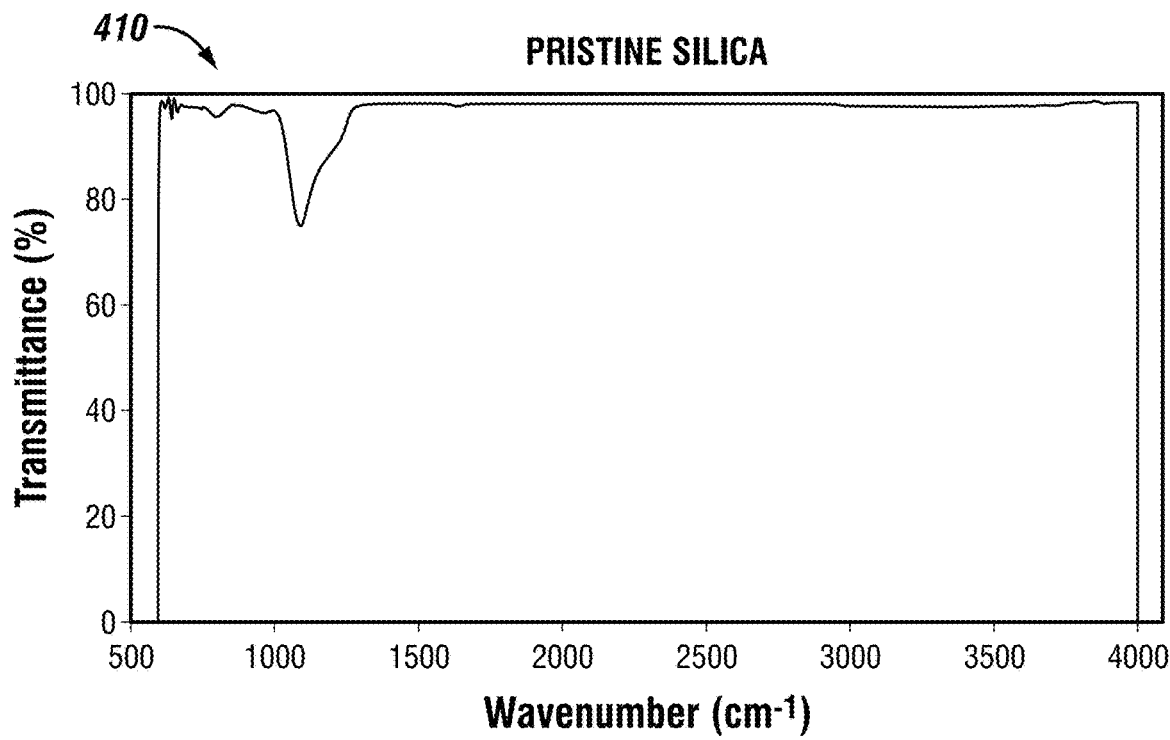
FIG. 4A is a graphical representation of a vibrational spectrum of pristine silica, according to an embodiment of the disclosure.
Figure 4B:
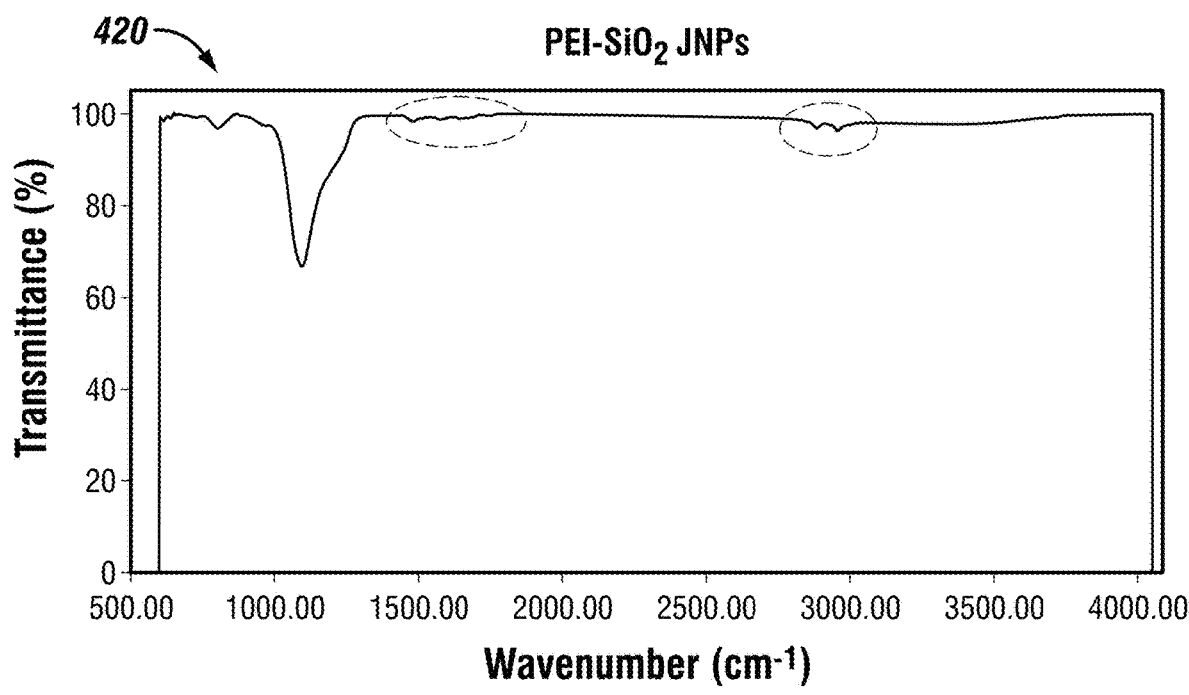
FIG. 4B is a graphical representation of a vibrational spectrum of the asymmetrically functionalized nanoparticle, according to an embodiment of the disclosure.
Figure 4C:
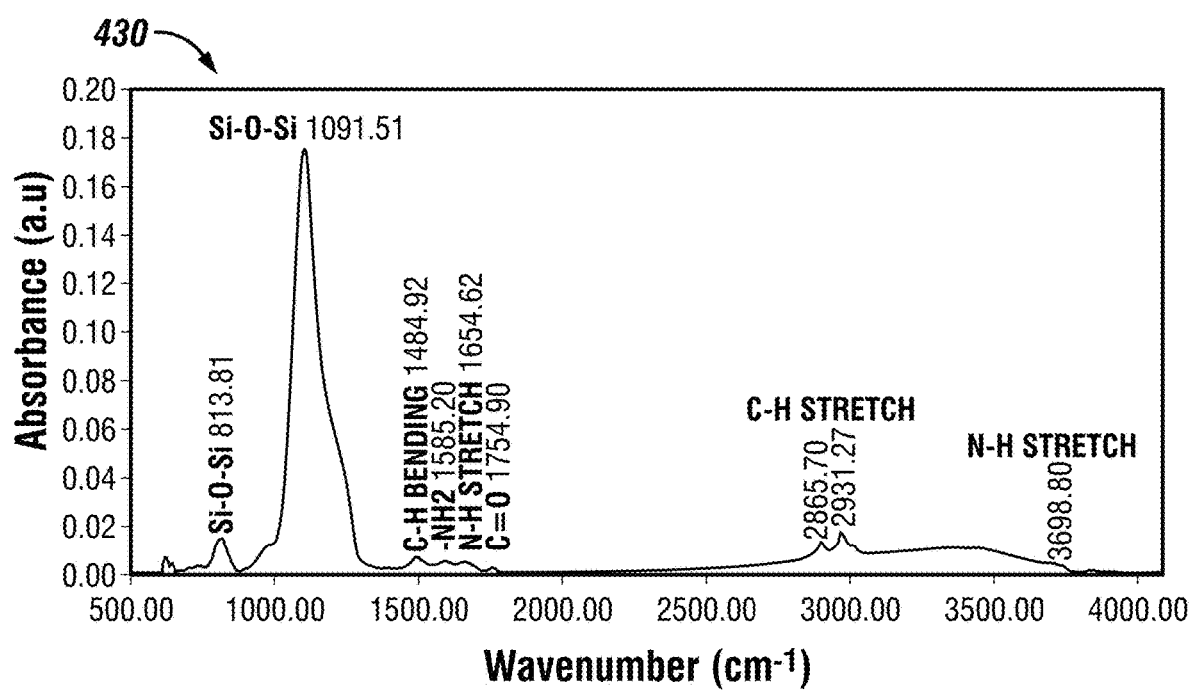
FIG. 4C is a graphical representation of a vibrational spectrum of the asymmetrically functionalized nanoparticle, according to an embodiment of the disclosure.

Fourier transform infrared (FTIR) spectroscopy was conducted to investigate the chemical composition of pristine silica and the polyethylenimine-silica Janus nanoparticles. The results are shown in FIGS. 4A-C. FIG. 4A shows an FTIR spectrum 410 of pristine silica in transmittance mode. As can be seen, the FTIR spectrum 410 of pristine silica shows two major peaks, one at about 814 wavenumbers ($cm^{-1}$) and the other at about 1092 $cm^{-1}$. These peaks correspond to a silicon-oxygen-silicon group present in silica. FIG. 4B shows an FTIR spectrum 420 of the polyethylenimine-silica Janus nanoparticles in transmittance mode. As can be seen, in addition to the two peaks referring to the silicon-oxygen-silicon group present in silica as in FIG. 4A, two other groups of peaks (corresponding to the dashed areas) can be observed at about 1,500-1,800 $cm^{-1}$ and at about 2,800-3,000 $cm^{-1}$. FIG. 4C shows an FTIR spectrum 430 of the polyethylenimine-silica Janus nanoparticles in absorbance mode. As can be seen, the FTIR spectrum 430 of the polyethylenimine-silica Janus nanoparticles shows two peaks at 813.81 $cm^{-1}$ and 1091.51 $cm^{-1}$ corresponding to silica. The peak at 1484.92 $cm^{-1}$ corresponds to carbon-hydrogen bending. The peak at 1585.20 $cm^{-1}$ corresponds to the hydrogen-nitrogen-hydrogen bending. The peaks at 1654.62 $cm^{-1}$ and 3698.80 $cm^{-1}$ correspond to the nitrogen-hydrogen stretch. The peak at 1754.90 $cm^{-1}$ corresponds to the carbonyl group. The peaks at 2865.70 $cm^{-1}$ and 2931.27 $cm^{-1}$ correspond to the carbon-hydrogen stretch. FTIR spectroscopy shows successful functionalization of polyethylenimine to the surface of the silica nanoparticle.

Example 4

Figure 5:
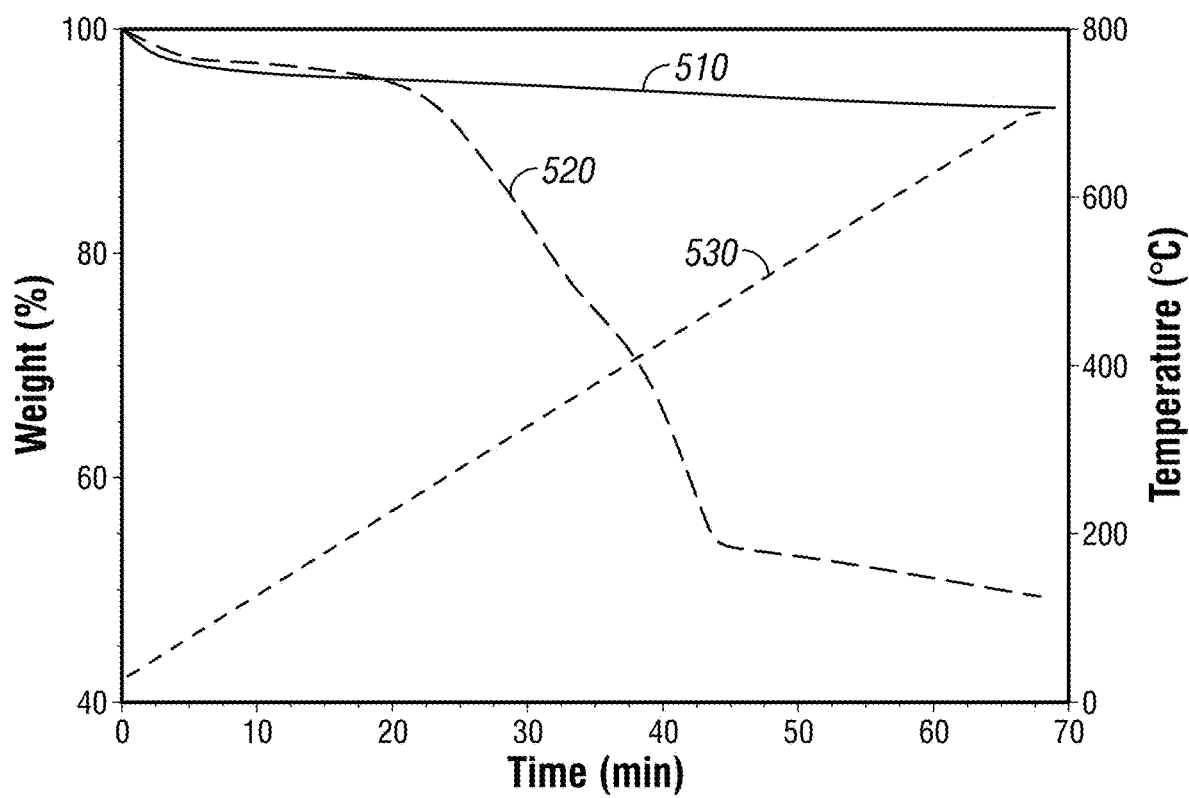
FIG. 5 is a graphical representation showing thermal gravimetric analysis on pristine silica and the asymmetrically functionalized nanoparticle, according to an embodiment of the disclosure.

Thermal gravimetric analysis (TGA) was conducted to further investigate the chemical composition of pristine silica and the polyethylenimine-silica Janus nanoparticles. The results are shown in FIG. 5. FIG. 5 shows two TGA curves as the temperature is gradually increased over time. Curve 510 corresponds to the TGA curve for pristine silica. Curve 520 corresponds to the TGA curve for the polyethylenimine-silica Janus nanoparticles. Line 530 corresponds to the temperature over time. Curve 510 shows one onset at about 90 deg. C. corresponding to the evaporation of water. Curve 520 shows a first onset at about 90 deg. C. corresponding to the evaporation of water. Curve 520 also shows a second onset at about 251.72 deg. C. corresponding to the detachment of amine ($—NH_2$) groups of the polyethylenimine. TGA studies show successful functionalization of polyethylenimine to the surface of the silica nanoparticle.

Example 5

Experiments were conducted to determine the suitability of the polyethylenimine-silica Janus nanoparticles as a component of a nanofluid used for oil recovery. Emulsions were prepared by mixing 4.0 mL of toluene, 4.0 mL of deionized water, 1.3 mL of a sodium sulfonate surfactant (Petronate® HL/L, Sonneborn, Parsippany, N.J.), and 2.0 mL of 5.0, 7.5, or 10.0 wt. % polyethylenimine-silica Janus nanoparticles dispersed in deionized water. After emulsification, the emulsions were placed still for about 24 hours to evaluate the migration of the polyethylenimine-silica Janus nanoparticles towards the oil-water interface. The water phase was dyed with Rhodamine B exhibiting a pink color. The polyethylenimine-silica Janus nanoparticle dispersion exhibited a light yellow color due to FITC labeling. The toluene phase was transparent.

Figure 6C:
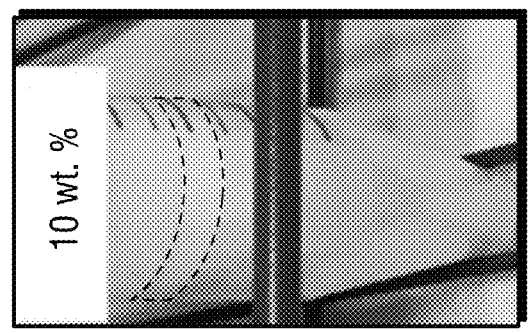
FIG. 6C is a photographical representation showing the asymmetrically functionalized nanoparticles forming a continuous phase between an oil phase and a water phase.
Figure 6B:
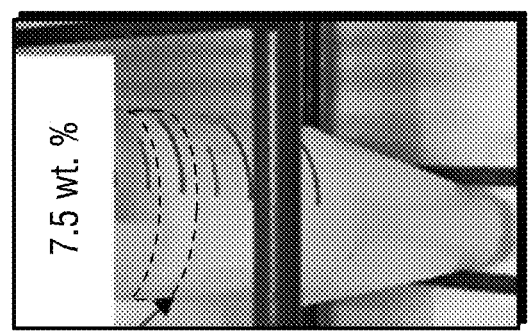
FIG. 6B is a photographical representation showing the asymmetrically functionalized nanoparticles forming a continuous phase between an oil phase and a water phase.
Figure 6A:
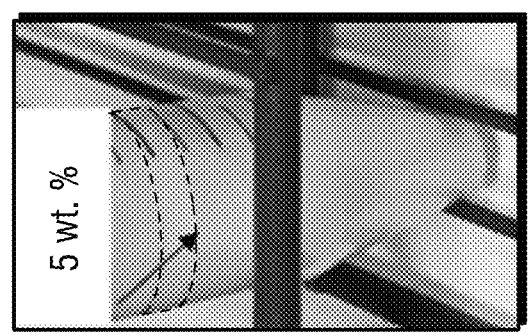
FIG. 6A is a photographical representation showing the asymmetrically functionalized nanoparticles forming a continuous phase between an oil phase and a water phase.

FIGS. 6A-C show the degree of migration of the polyethylenimine-silica Janus nanoparticles after 24 hours. FIGS. 6A-C all show Winsor III type systems where the polyethylenimine-silica Janus nanoparticles and the sodium sulfonate surfactant form a continuous phase (light yellow, indicated by the dashed area in FIGS. 6A-C) separating the upper oil phase (transparent) and the lower water phase (pink). FIG. 6A shows a 5.0 wt. % polyethylenimine-silica Janus nanoparticle dispersion mixed with the toluene-water emulsion. FIG. 6B shows a 7.5 wt. % polyethylenimine-silica Janus nanoparticle dispersion mixed with the toluene-water emulsion. FIG. 6C shows a 10.0 wt. % polyethylenimine-silica Janus nanoparticle dispersion mixed with the toluene-water emulsion. The results show that 10 wt. % is the optimum concentration of the polyethylenimine-silica Janus nanoparticles for forming a Winsor III type system suitable for use as a nanofluid in tertiary oil recovery.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for synthesizing an asymmetrically functionalized nanoparticle, the method comprising the steps of:
    surface-treating a base nanoparticle with an alcohol such that the base nanoparticle has hydroxyl groups distributed throughout an exterior of the base nanoparticle;
    dispersing the base nanoparticle in an aqueous solvent to form an aqueous dispersion;
    introducing a waxy material to the aqueous dispersion to form an emulsion, where the emulsion is maintained at a temperature greater than a melting point of the waxy material, where the emulsion includes liquid colloidosomes comprising the waxy material as an interior component and the base nanoparticle as an exterior component;
    cooling the emulsion to a temperature less than the melting point of the waxy material such that solidified colloidosomes are formed;
    chemically modifying an exposed surface of the base nanoparticle using a functionalizing material comprising polyethylenimine; and
    removing the waxy material to release the asymmetrically functionalized nanoparticle.

2. The method of claim 1, where the asymmetrically functionalized nanoparticle is amphiphilic.

3. The method of claim 2, where the base nanoparticle has a lipophilic surface prior to surface-treating.

4. The method of claim 2, where the functionalizing material is hydrophilic.

5. The method of claim 1, where the base nanoparticle comprises silicon dioxide.

6. The method of claim 1, where the base nanoparticle has a size ranging between 80 nm and 200 nm.

7. The method of claim 1, where a fluorophore is labeled to the polyethylenimine.

8. The method of claim 7, where the fluorophore is fluorescinisothiocyanate.

9. The method of claim 1, where the alcohol is selected from the group consisting of: methanol, ethanol, propanol, combinations of the same, and aqueous solutions of the same.

10. The method of claim 1, where the waxy material comprises paraffin wax.

11. The method of claim 1, where the surface-treating step is conducted at a temperature ranging between 60 deg. C. and 70 deg. C. for a duration ranging between one hour and two hours.

12. The method of claim 1, where the introducing step is conducted at a temperature ranging between 60 deg. C. and 100 deg. C.

13. The method of claim 1, where the removing step includes dissolving the waxy material with an organic solvent.

14. The method of claim 13, where the organic solvent is selected from the group consisting of: chloroform, toluene, diethyl ether, and combinations of the same.

15. A method for hydrocarbon recovery using an asymmetrically functionalized nanoparticle, the method comprising the step of:
    introducing the asymmetrically functionalized nanoparticle to a subterranean formation, wherein the asymmetrically functionalized nanoparticle is formed by the steps of:
    surface-treating a base nanoparticle with an alcohol such that the base nanoparticle has hydroxyl groups distributed throughout an exterior of the base nanoparticle;
    dispersing the base nanoparticle in an aqueous solvent to form an aqueous dispersion;
    introducing a waxy material to the aqueous dispersion to form an emulsion, where the emulsion is maintained at a temperature greater than a melting point of the waxy material, where the emulsion includes liquid colloidosomes comprising the waxy material as an interior component and the base nanoparticle as an exterior component;
    cooling the emulsion to a temperature less than the melting point of the waxy material such that solidified colloidosomes are formed;
    chemically modifying an exposed surface of the base nanoparticle using a functionalizing material comprising polyethylenimine; and
    removing the waxy material to release the asymmetrically functionalized nanoparticle;

where the subterranean formation includes crude oil and water forming an interface; and where the asymmetrically functionalized nanoparticle reduces interfacial tension between the crude oil and the water at the interface.

16. The method of claim 15, where the asymmetrically functionalized nanoparticle is amphiphilic.

17. The method of claim 16, where the base nanoparticle has a lipophilic surface prior to surface-treating.

18. The method of claim 16, where the functionalizing material is hydrophilic.

19. The method of claim 15, where the base nanoparticle comprises silicon dioxide.

20. The method of claim 15, where the base nanoparticle has a size ranging between 80 nm and 200 nm.

21. The method of claim 15, where a fluorophore is labeled to the polyethylenimine.

22. The method of claim 21, where the fluorophore is fluorescinisothiocyanate.

* * * * *